Sept. 5, 1939.  H. M. BIEBEL  2,171,520
AUTOMATIC ELECTRIC TOASTER
Filed Aug. 12, 1938  2 Sheets—Sheet 1
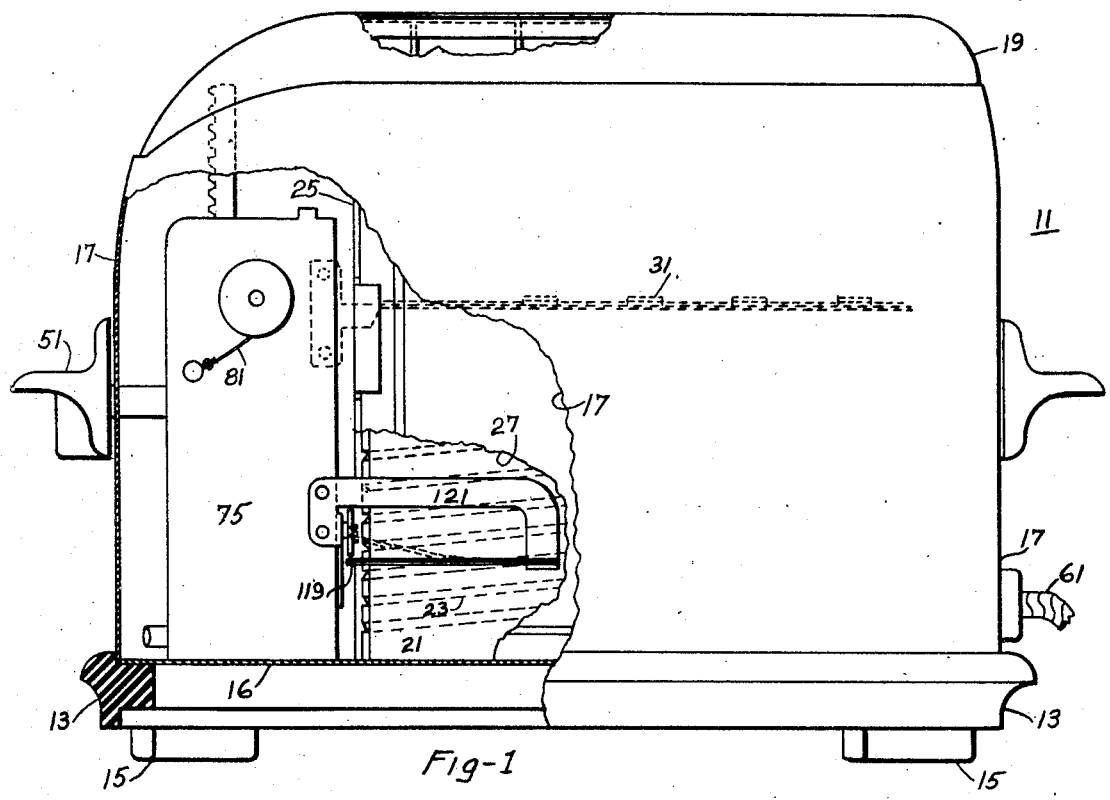
Fig-1
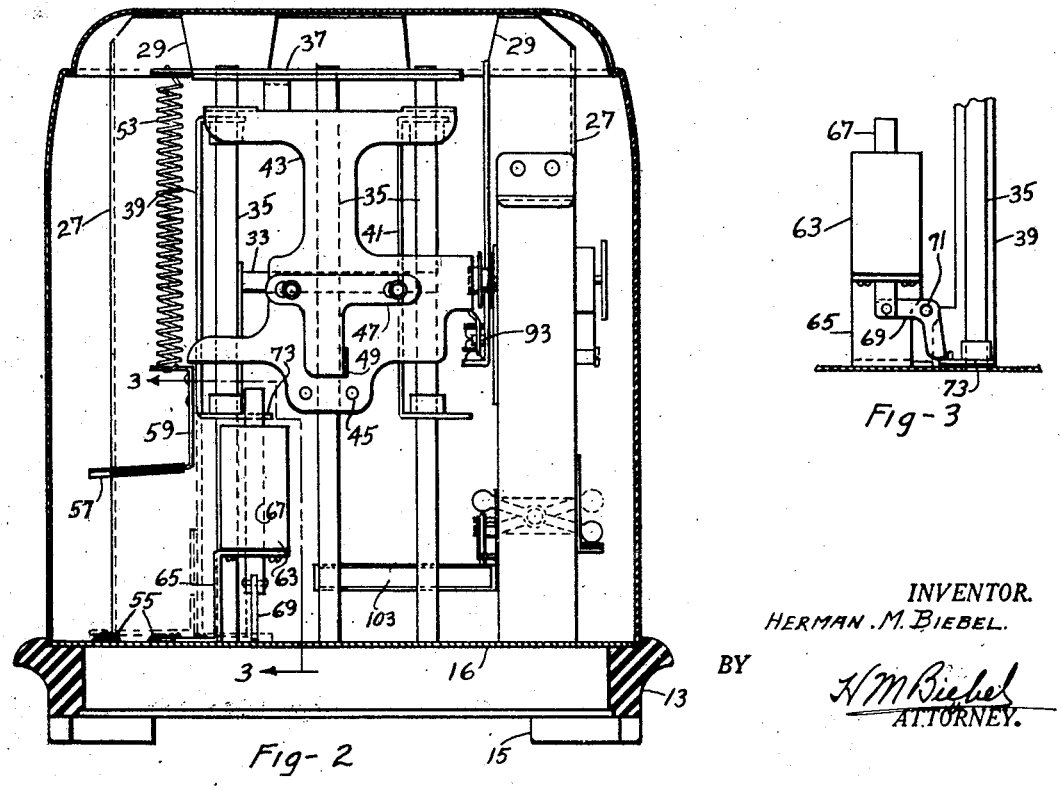
Fig-2
Fig-3
INVENTOR.
HERMAN M. BIEBEL.
BY
H M Biebel
ATTORNEY.

Sept. 5, 1939.   H. M. BIEBEL   2,171,520
AUTOMATIC ELECTRIC TOASTER
Filed Aug. 12, 1938   2 Sheets-Sheet 2
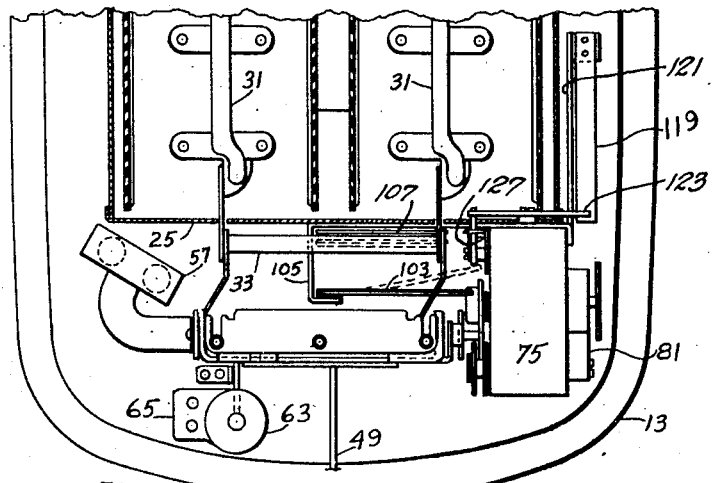
Fig-4
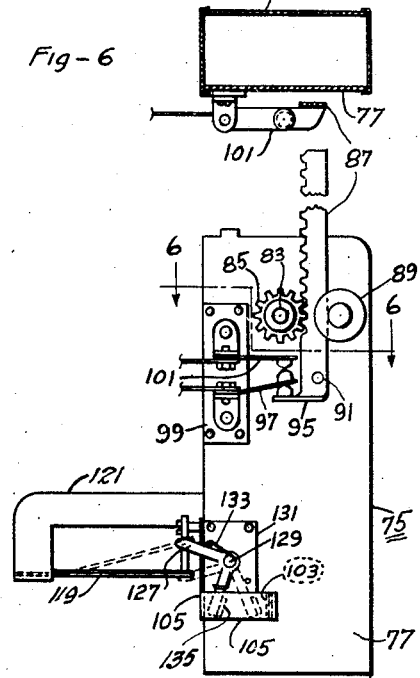
Fig-6
Fig-5
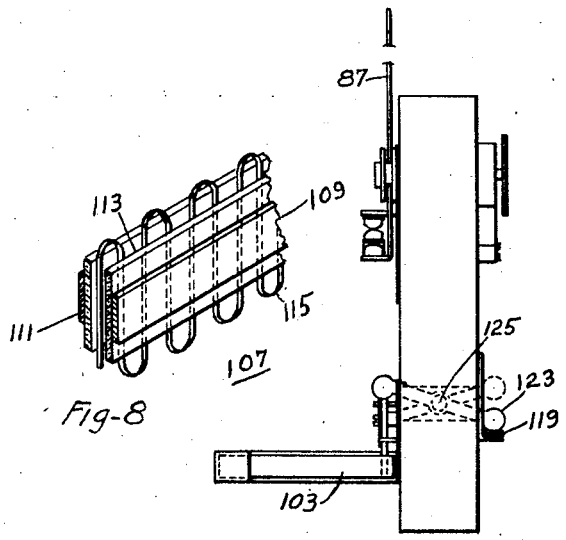
Fig-8
Fig-7
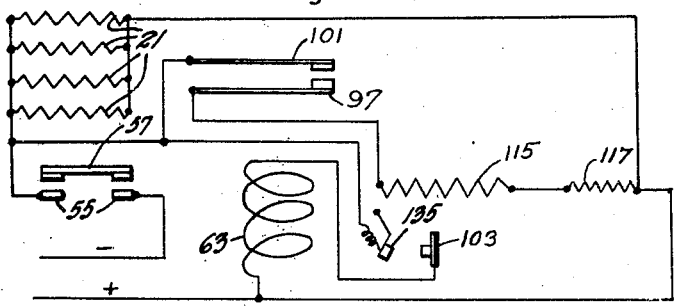
Fig-9
INVENTOR.
HERMAN. M. BIEBEL
BY
H. M. Biebel
ATTORNEY.

Patented Sept. 5, 1939

2,171,520

UNITED STATES PATENT OFFICE 2,171,520

AUTOMATIC ELECTRIC TOASTER

Herman M. Biebel, Elgin, Ill., assignor to McGraw Electric Company, Chicago, Ill., a corporation of Delaware Application August 12, 1938, Serial No. 224,448

13 Claims. (Cl. 219—19)

My invention relates to electric cooking appliances and particularly to automatic electric toasters.

An object of my invention is to provide a novel combination of timing means for determining the duration of a cooking operation.

Another object of my invention is to provide a unitary composite timing means for a cooking or toasting appliance to terminate the operation thereof.

Another object of my invention is to provide a toaster comprising a mechanical timer operable only during the initial part of a toasting operation and a thermal timer operable only during the final part of a toasting operation, the operation of the thermal timer being initiated by the mechanical timer.

Still another object of my invention is to provide a toaster having a plurality of timing means assembled in unitary relationship with each other and operable in predetermined sequence during a given toasting operation, the first timing means being effective to start the other succeeding timing means, each timing means being designed and constructed to operate under optimum working conditions.

Still another object of my invention is to provide a toaster having a mechanical timer operative for a fixed duration of time and effective to initiate the operation of a variable duration thermal timer, the latter utilizing only the heat-up period of a thermal element.

Still another object of my invention is to provide a completely assembled timing means including at least two different kinds of timing mechanism that shall be insertable into and removable from an electric cooking or toasting device with which it is to be associated, as a unit.

Other objects of my invention will either be apparent from a description of one form of toaster embodying my invention or will be pointed out specifically hereinafter either in the course of such description or in the appended claims.

While I have illustrated and described a single embodiment only of my invention it is to be understood that the claims are not to be limited thereby but that all obvious modifications covered by the appended claims shall be included.

In the drawings,

Fig. 1 is a view in side elevation, with parts of the cover and of the casing broken away, of an automatic electric toaster embodying my invention, Fig. 2 is a view in front elevation thereof with the front wall of the casing removed, Fig. 3 is a fragmentary view in vertical section, taken on the line 3—3 of Fig. 2, Fig. 4 is a fragmentary top plan view, particularly of the front end of a toaster embodying my invention, Fig. 5 is a view in side elevation of a mechanical timer constituting a part of my invention, Fig. 6 is a horizontal sectional view thereof taken on the line 6—6 of Fig. 5, internal parts of the timer being omitted, Fig. 7 is a view in front elevation of the mechanical timer shown in Fig. 5, Fig. 8 is a fragmentary view in perspective of an auxiliary electrical heater constituting a part of my invention, and, Fig. 9 is a diagram of the electrical connections of the toaster.

Referring first to Figs. 1, 2 and 3 of the drawings I have there illustrated an automatic electric toaster 11 which may be of the type which has been manufactured for some time and the main parts of which are described in detail in Ireland Patent No. 2,001,362. Since the main parts of the toaster are standard only such description will be given thereof as appears necessary in order to more clearly set forth what is considered to be the invention.

A toaster assembly 11 includes a skeleton base frame 13 which may be of a suitable molded composition material having depending supporting legs 15 and having associated therewith a base plate 16 which may be secured to the upper recessed part of the frame in any suitable or desired manner now well known in the art. A casing 17 comprising front, rear and side walls is provided and has associated therewith a cover member 19 all of which are now well known in the art. A toasting chamber structure is enclosed by the base plate, the casing and the cover and located therein are a pair of vertically extending planar heating elements 21, each of which includes one or more pieces or sheets of thin electric-insulating material, such as mica, on which is wound a resistor 23. A pair of such spaced heating elements is provided for each slice of bread which the toaster is designed to toast simultaneously and while I have illustrated a two slice toaster my invention is not limited thereto and may be applied to toasters designed and constructed to simultaneously toast any number of slices of bread.

The toaster chamber structure includes a rear intermediate wall, not shown in detail in the drawings, a front intermediate wall 25 and the two outermost vertical heating elements just described. Baffle plates 27 may be provided at the sides of the toasting chamber structure, all in a manner well known in the art.

The lower ends of the vertical heating elements are held in a manner well known in the art, which may be that described in Patent No. 2,001,362 and the upper end of the toasting chamber structure may comprise top frame plates 29 having openings therein registering with openings in the cover to permit of the insertion and removal of slices of bread into and out of the toasting chamber.

If desired the base plate 15 may also be provided with longitudinally extending openings therein to permit of a through draft of cooling air flowing through the toasting chambers and particularly through the space between each pair of heating units, all in a manner now well known in the art.

Bread slice supports 31, equal in number to the number of slices of bread to be toasted are provided and are positioned between each pair of spaced heating elements and are vertically movable upwardly and downwardly. The bread slice supports are connected by a cross bar 33 so that they will move together.

A plurality of vertical standards 35, here shown as three in number, are provided in front of the front intermediate wall 25 in what may be termed a mechanism chamber, the bottom ends of the respective standards being fixed in the base plate 15 and the top ends thereof being held either by forward extensions of the top frame plates 29 or by a narrow plate 37 the ends of which are secured in any desired manner to the outermost standards and to the forward extensions of the top frame plates 29.

A slider 39 is vertically movable on the left hand standard 35 and a substantially similar slider 41 is vertically movable on the right hand standard 35. These two sliders are rigidly connected with the bread slice supports 31 and the cross bar 33 so that the sliders, the cross bar and the connections between the sliders and the bread slice supports will constitute a structure movable on the standards as a unit.

A carriage 43 is positioned above the sliders 39 and 41 and may be guided not only by the outermost standards as by bushings surrounding them but may also be guided by the middle standards as by rollers mounted on stub shafts 45. A handle bracket 47 is secured to the front surface of carriage 43 and has a portion 49 extending through a slot in the front wall of the casing 17, and an actuating knob 51 being secured to the projecting part of portion 49. This permits of an operator moving the bread slice supports 31 from their uppermost position into which they are biased by a spring 53 to a lowermost position, the uppermost position being what is usually called the non-toasting position while the lower position is the toasting position. When the bread slice supports are in their lowermost position any slice or slices of bread resting thereon will be positioned within the toasting chamber and subject to the heat of the energized heating elements to be toasted thereby.

Means for energizing the main heating elements 21 may include a pair of contact members 55 insulatedly and fixedly mounted on the upper face of base plate 15 and a contact bridging member 57 which latter is supported by a resilient member 59 secured to the lower end portion of slider 39. Bridging member 57 is insulatedly mounted on member 59 and when knob 51 is pressed downwardly this contact bridging member engages the fixed contact members 55 to thereby close a circuit through the main heating elements, it being assumed of course that suitable supply circuit connections have been made to the toaster through a twin conductor cord 61, in a manner well known in the art.

A detent means for holding the bread slice supports in their lowermost positions during a toasting operation includes a solenoid 63 supported on a bracket 65 in the mechanism chamber. A core member 67 of magnetic material is vertically movable within the solenoid 63 and is pivotally connected with a detent 69 which is generally of bellcrank shape pivotally mounted as at 71 (see Fig. 3). Left hand slider 39 is provided with an extension 73 which extension is so constructed and positioned as to be movable below the depending end of detent 69 to be held thereby in a lowered position where the bread slice supports will be held in the above described toasting position. Means for causing movement of the bellcrank lever to effect quick upward movement of the bread slice supports will be described in detail hereinafter.

My invention comprises particularly a plurality of timing mechanisms operating in different manners, one of these timing mechanisms being a mechanical timer designated by the numeral 75 and the other of these timers being a thermal timing means. The mechanical timer may be the same as that shown in Ireland Patent No. 1,866,808 or its equivalent and while the structure shown in Ireland Patent No. 1,866,808 is primarily designed for variable durations of operation, the mechanical timer 75 is such as to have a substantially fixed duration of operation, the general details, however, being very similar. The timer includes a casing comprising an outer side wall 77 and an inner side wall 79, a spring 81 secured in well known manner to the outside of plate 77 and a gear train operable by the spring. The spring 81 has one end thereof secured to an arbor 83 on which arbor there is mounted a pinion 85 which is adapted to mesh with a rack bar 87 which rack bar is adapted to be held in engagement with pinion 85 by a grooved roller 89, all in a manner now well known in the art. The rack bar 87 is provided with a laterally projecting pin 91 which pin is adapted to be engaged by an extension 93 on carriage 43 so that downward movement of the carriage will move rack bar 87 downwardly and cause winding up of the spring, the rack bar then being slowly moved upwardly by the spring as soon as the operator releases his pressure on knob 51. As is evident from what has already been said, sliders 39 and 41 are also moved downwardly when the carriage is moved downwardly but these sliders and the bread slice supports secured thereto are retained in their lowermost position by the detent so that the heating elements energized by the engagement of the contact bridging member 59 with contacts 55 will act to toast the slice of bread.

As is well known in the art the duration of a toasting operation may vary within relatively wide limits dependent upon the voltage of the supply circuit energizing the heating elements and upon the kind of bread being toasted and the degree of brownness to which the bread is to be toasted. If the toaster is cold, the supply circuit voltage is low, and "dark toast" is wanted, the duration of the toasting operation may be three minutes or more. On the other hand, when the voltage of the supply circuit is high, the toaster is hot, and a "light toast" is desired, the duration of a toasting operation may be on the order of one minute or even slightly less. Thus since the mechanical timer 75 is to operate during the initial portion of a toasting operation its total time of operation should be slightly less than the minimum time mentioned above since a fixed time less than the minimum of the total duration of a toasting operation is to be taken up by the mechanical timer, while a thermal timer is to provide a variable duration which when heated to that temperature determined by the mechanical mer will result in toasting the slice of bread to the desired degree.

The operation of the thermal timer is initiated by the mechanical timer and for this purpose the lower end of rack bar 87 has secured thereto a small lug 95 of electric-insulating material which is adapted to engage a spring contact bar 7 supported on a small plate 99 of electric-insulating material secured to the outer plate 77 of the timer. A second contact bar 101 is also supported on plate 99 and when rack bar 87 has been moved to its uppermost position lug 95 will engage spring contact bar 97 and will move it into engagement with contact bar 101.

The thermal timer includes a main bimetal bar 103 which is supported by a bracket 105 which bracket is mounted on the inner face of timer 75. Bracket 105 extend away from the timer 75 so that bimetal element 103 has the far end thereof (with relation to timer 75) secured to the bracket while the near end of bimetal bar 103 is movable and, as shown particularly in Fig. 4 of the drawings, the free end is adapted to move in a counterclockwise direction when heated.

Means for thermally energizing the main bimetal bar 103 includes an auxiliary electric heating element 107 which element may be supported by the front intermediate wall 25 adjacent to but spaced from the main bimetal element 103. The auxiliary electric heater 107 may include a front metal clamping bar 109, a rear clamping bar 111 and two strips of electric insulating material 113, such as mica, a resistor 115 being clamped therebetween preferably in such manner that at least a part of the resistor 115 is bare to radiate heat directly against main bimetal element 103. While I have illustrated and described a particular form or construction of the auxiliary heating element I do not desire to be limited thereto. The resistor 115 may either be a high resistance fine wire resistor or as shown in Figs. 8 and 9 it may be a short length of relatively heavy wire and a current limiting resistor 117 (see Fig. 9) may be connected in series circuit therewith, the energization of the resistor 115 being controlled by the cooperating contact bars 99 and 101.

It is obvious that with the auxiliary heating element 107 mounted on the front wall of the toasting chamber, the temperature thereof, at the start of successive toasting operations, will vary to some extent in accordance with the temperature of the toasting chamber. That is, starting with a cold toaster the auxiliary heating element parts will also be relatively cold but after one or more toasting operations not only will the toasting chamber structure be at a higher temperature but the parts of the auxiliary heater will have a somewhat higher temperature thereby providing an inherent compensating means to reduce the thermal lag which must be overcome by the resistor, which thermal lag usually causes a lag in the operation of a bimetal bar thermally affected by such a heater, all in a manner now well known in the art.

I prefer to provide an additional compensating means to take care of the variations in temperature of the toasting chamber structure as well as any deleterious effects of thermal lag in the main bimetal element by the provision of a second bimetal bar 119 which bar is positioned outside of the toasting chamber and at one side thereof as shown more particularly in Fig. 1 of the drawings. The adjacent baffle plate is preferably provided with an opening so that bar 119 will be subjected to the relatively high temperature of the outermost heating element. The far end of bimetal bar 119 (with reference to timer 75) is fixedly supported on a bracket arm 121 constituting a part of the above mentioned bracket 105 and bimetal bar 119 is adapted to have its free end flexed upwardly or in a clockwise direction, as seen in Fig. 1, when heated. A lever arm 123 is pivotally mounted on the rear face of timer structure 75 as by a pivot pin 125 one end of lever arm 123 being positioned to be engaged by auxiliary bimetal bar 119 and moved upwardly to cause the other end thereof to move downwardly. The other end of lever arm 123 is adapted to engage one arm of a bellcrank lever 127 which bellcrank lever is pivotally mounted on a pivot pin 129 on plate 77 of the timer. This pivot pin, if of metal, is mounted on a small plate 131 of electric insulating material. Bellcrank lever 127 is biased in a clockwise direction by a spring 133 so that it will normally occupy the position shown by the full lines in Fig. 5 of the drawings. When auxiliary bimetal bar 119 is heated its free end will warp upwardly causing turning movement of lever arm 123 and of the bellcrank lever 127 so that it will occupy, as a limit, the position shown by the broken lines in Fig. 5 of the drawings or any intermediate position depending upon its temperature, its temperature depending upon that of the toasting chamber structure. A contact member 135 may be mounted on the lower arm of bellcrank lever 127.

The circuit of the solenoid 63 is controlled by contact members, one on the main bimetal bar 103 and the other on one arm of bellcrank lever 127. When bimetal bar 103 warps as a result of being heated by resistor 115 in one direction and when bellcrank lever 127 has its depending arm moved toward the free end of main bimetal bar 103, engagement of the two contact members moved by these two elements will close an energizing circuit through solenoid 63 which will energize the core 67 causing an upward and releasing movement of the detent 69 whereby spring 53 will cause quick upward movement of the bread slice supports and the bread slices thereon, at the termination of a toasting operation.

While I have illustrated and described a particular construction of the cooperating contact members and their supports, it is obvious that this is only one way in which such a structure can be designed and I may if I so desire make slight variations in these supports with the object of providing the simplest possible structure to insulate the moving contact members from the other mechanical parts of the unitary timer structure and since the use of flexible leads on insulatedly mounted contact members is now well known in the art I do not deem it necessary to show alternate structures for effecting the desired insulation of the control circuit for the release of the detent.

The operation of the composite and unitary timing means particularly embodying my invention is substantially as follows. Having placed the desired number of slices of bread on the bread slice supports the operator presses down on the knob 51 thereby moving the bread slice supports into toasting position as already described, and at the same time moving rack bar 87 downwardly to wind up the spring of the mechanical timer. The bread slice supports are retained by detent 69 in their lowermost position while the spring causing slow upward movement of the rack bar 87, as has already been hereinbefore set forth, is designed, constructed and arranged to operate during a substantially fixed time, which time is less than the minimum duration of a toasting operation.

When rack bar 87 has been moved to its uppermost position as shown for instance in Fig. 5 of the drawings, it causes engagement of contact bar 97 with contact bar 101 thereby energizing auxiliary heater 115. Auxiliary heater 115 thermally affects main bimetal bar 103 which flexes and causes movement of its free end toward the contact member on bellcrank lever 127.

At the same time auxiliary bimetal bar 119 is thermally affected by heat from the toasting chamber and will cause flexing movement of its free end to cause turning movement of bellcrank lever 127 in a counterclockwise direction so that the two contact members controlling the energizing circuit of solenoid 63 will be caused to approach each other. The duration of time between the initial energization of auxiliary heater 115 and the engagement of the contact members on bellcrank lever 127 and on main bimetal bar 103 depends of course upon the temperatures of the respective bimetal bars. The temperature of the main bimetal bar 103, subjected to relatively high temperature radiant heat from resistor 115 (which resistor is preferably operated at at least incipient red heat) depends upon the length of time during which it is subjected to said radiant heat. The temperature of auxiliary bimetal 119 is similarly dependent upon the temperature of the toasting chamber structure to which it responds as well as to the length of time and it is therefore obvious that the duration of operation of the thermal part of the composite timing means can be made such as to properly complete the toasting of a slice or slices of bread to the desired degree.

The composite timer embodying my invention has one very important advantage in that the main bimetal bar will have a relatively long period of time in the early part of a succeeding toasting operation during which it may cool to a lower temperature, this temperature being of course somewhat higher than that of the ambient air or that of the immediately adjacent parts of the toaster or timer structure, which parts may affect its temperature.

It is understood that the operating temperatures of the two bimetal bars or the temperature which they will attain as respective maximums should preferably be relatively high so that they may cool the more rapidly because of the relatively greater amount of heat which they will radiate at high temperatures while reaching a minimum temperature, during successive operations, which is higher than that of the surrounding parts of the toaster structure.

I am aware of thermal timing means utilizing a plurality of thermal timing means operable in predetermined sequence in the course of a single toasting operation. I am further aware of the use of a single thermally actuable element to determine the duration of a toasting operation, the thermally actuable element being first heated and then cooled during a given toasting operation. If the time between immediately succeeding toasting operations is very small, it is difficult but not impossible, to effect the desired degree of cooling in the sometimes very short time allowable therefor. In contradistinction to this the thermal element in my composite timer will have on the order of forty seconds in which to cool, this being the duration of operation of the fixed-time mechanical timer.

The unitary assembly of the plurality of timers, one of which is entirely independent of toaster temperature and the other of which is dependent on toaster temperature, provides a simple, easily installed and easily removed timer structure which may be assembled and adjusted as a unit before being mounted in proper operative position on a toaster.

I claim as my invention:

1. An automatic electric toaster comprising an electric heating element, a main control switch therefor biased to open position, means to close said switch, a detent for holding said switch in closed position and means for causing switch opening movement of said detent including a mechanical timer windable by said switch closing means, a thermostatic timer including a thermally-responsive member, an auxiliary electric heating element in heat transmitting relation to said thermally-responsive member, a normally open switch for said auxiliary heating element closable by said mechanical timer after a predetermined time of operation thereof, said thermally-responsive member causing releasing movement of said detent when the temperature of said thermally-responsive member has reached a predetermined value.

2. An automatic electric toaster comprising an electric heating element, means for initiating a toasting operation and means for terminating a toasting operation after a time interval varying with toaster temperature, said terminating means including a mechanical timer energizable by said initiating means for defining an initial fixed time interval of operation and a normally deenergized thermal timer for defining a final variable time interval of operation, said thermal timer being energized by the mechanical timer at substantially the end of the operating period of said mechanical timer and operative to terminate a toasting operation when the temperature of a predetermined part of the thermal timer has reached a predetermined value.

3. An automatic electric toaster comprising an electric heating element, means for initiating a toasting operation and means for terminating a toasting operation, said terminating means including a mechanical timer and a normally deenergized thermal timer operable in sequence during a given toasting operation, said mechanical timer being energized by said initiating means, operating for a fixed time interval and effective to energize said thermal timer at substantially the end of its operating period, said thermal timer being effective to terminate a toasting operation when the temperature of a selected part thereof has reached a predetermined value.

4. An automatic electric toaster comprising an electric heating element, a bread slice support movable into toasting and non-toasting position relatively to said heating element and biased to non-toasting position, means for moving said bread support to toasting position, a detent for holding said bread support in toasting position, a mechanical constant speed timer energizable by said bread-support-moving means to operate during a fixed time interval in the first part of a toasting operation, a thermally operable timer including a bimetal element and an auxiliary electric heater in heat-transmitting relation to said bimetal element, means for causing energization of said auxiliary electric heater by said mechanical timer at substantially the end of its operating period and means cooperating with and controlled by said bimetal element when it has reached a predetermined high temperature for effecting release movement of said detent to terminate a toasting operation.

5. An automatic electric toaster comprising a main electric heating element, a control switch therefor biased to open position, means to cause closing of said switch, an electromagnetically-controlled detent means to hold said switch in closed position, a constant speed mechanical timer energizable by said switch closing means and having a member moving in a fixed path during operation of the mechanical timer, a thermally-operable timer supported solely by said mechanical timer and including a main thermally-actuable member, an auxiliary electric heater in heat-transmitting relation to said main thermally-actuable member, an auxiliary thermally-actuable member positioned to be affected by heat directly from the main electric heating element, a normally open switch controlling the energization of the auxiliary electric heater supported solely by said mechanical timer in position to be closed by said member of the mechanical timer moving in a fixed path, at substantially the end of the travel of said mechanical timer member and means including contact members actuable by said main and auxiliary thermally-actuable members and circuit connections between said contact members and the magnet of said detent means for causing release of said detent when said main thermally-actuable member has been heated to a predetermined high temperature.

6. A device as set forth in claim 1 in which the thermally-responsive member and the normally open switch are supported solely by the mechanical timer.

7. A device as set forth in claim 1 in which the thermally-responsive member, the auxiliary electric heating element and the normally open switch are supported solely by the mechanical timer and including also a second thermally-responsive member supported by the mechanical timer subject to toaster chamber temperature and cooperating with said first named thermally responsive member to effect termination of a toasting operation after a time interval varying in accordance with toaster temperature.

8. An automatic electric toaster comprising a toasting chamber, a heat element therein, means to initiate a toasting operation and means to terminate a toasting operation after a time interval the duration of which is dependent on toasting chamber temperature, said terminating means including a composite timing means including a constant speed mechanical timer energizable by the initiating means at the start of a toasting operation to operate for a fixed period of time less than the shortest duration of a toasting operation of said toaster and a thermal timer energizable by means controlled by the mechanical timer and actuable thereby at substantially the end of its operating period and including a thermally-actuable element subject to toaster chamber temperature, said thermal timer being operable to terminate a toasting operation when the temperature of different parts of the thermal timer have reached respectively predetermined values.

9. An automatic electric toaster comprising a toasting chamber, a main heating element therein, means to initiate a toasting operation and means to terminate a toasting operation after a time interval the length of which is dependent on toasting chamber temperature, said terminating means including a unitary composite timing means comprising a mechanical timer energizable by said initiating means at the start of a toasting operation to operate for a fixed length of time less than the shortest duration of a toasting operation of said toaster, a thermal timer including a main bimetal element, an auxiliary bimetal element, an auxiliary electric heater in heat transmitting relation to said main bimetal element, bracket means secured to said mechanical timer supporting said main bimetal element out of direct thermal communication with said main heating element and supporting said auxiliary bimetal element in position to be affected directly by toasting chamber temperature, a normally open switch for said auxiliary heater mounted on and closable by said mechanical timer at substantially the end of its operation and means including said main and said auxiliary bimetal element for terminating a toasting operation when the temperatures of said main and said auxiliary bimetal elements have reached respectively predetermined values.

10. A device as set forth in claim 1 and including a second thermally-responsive member subject to toaster chamber temperature and cooperating with said first named thermally-responsive member to cause releasing movement of said detent after a time interval the length of which varies in accordance with toaster temperature.

11. A device as set forth in claim 1 in which said detent is releasable by electromagnetic means and including a second thermally-responsive member subject to toaster chamber temperature for cooperating with said first named thermally-responsive member to close an electric circuit through said electromagnetic detent release means after a time interval, the length of which decreases with increase of toaster temperature.

12. In an automatic electric toaster, the combination with a main electric heating element, a bread carrier movable into toasting and non-toasting positions relatively to said main heating element and yieldingly biased to non-toasting position, means for moving said carrier to toasting position and a detent for holding said carrier in toasting position, of means for causing releasing movement of said detent after a time interval including a mechanical timer windable by said carrier-moving means, a thermostatic timer including a thermally-responsive member, an auxiliary electric heating element in heat transmitting relation to said thermally-responsive member, a normally open switch for said auxiliary heating element closable by said mechanical timer after a predetermined time of operation thereof, said thermally-responsive member causing releasing movement of said detent when the temperature of the thermally-responsive member has reached a predetermined value.

13. A device as set forth in claim 12 in which said detent releasing means includes an electromagnetic means, and which device includes a second thermally-responsive member positioned to be subjected to toaster chamber temperature, for cooperating with said first named thermally-responsive member, when the temperatures of said thermally-responsive members have reached respectively predetermined values, to close an electric circuit through said electromagnetic release means after a time interval, the length of which decreases with increase in toaster temperature.

HERMAN M. BIEBEL.